(12) United States Patent
Zhu et al.

(10) Patent No.: US 11,821,614 B2
(45) Date of Patent: Nov. 21, 2023

(54) PHOTOGRAPHIC LAMP AND LIGHTING ASSEMBLY

(71) Applicant: ZHONGSHAN DASHAN PHOTOGRAPHIC EQUIPMENT CO., LTD., Zhongshan (CN)

(72) Inventors: Xihua Zhu, Zhongshan (CN); Jinhua Duan, Zhongshan (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 0 days.

(21) Appl. No.: 17/821,193

(22) Filed: Aug. 22, 2022

(65) Prior Publication Data

US 2023/0184416 A1  Jun. 15, 2023

(30) Foreign Application Priority Data

Dec. 10, 2021 (CN) .......................... 202123125769.0

(51) Int. Cl.
*F21V 21/28* (2006.01)
*G03B 15/02* (2021.01)
(Continued)

(52) U.S. Cl.
CPC .............. F21V 21/28 (2013.01); G03B 15/02 (2013.01); *F21V 21/14* (2013.01); *F21V 21/145* (2013.01);
(Continued)

(58) Field of Classification Search
CPC ........ F21V 21/14; F21V 21/145; F21V 21/22; F21V 21/24; F21V 21/26; F21V 21/28;
(Continued)

(56) References Cited

U.S. PATENT DOCUMENTS

2011/0023238 A1* 2/2011 Orzeck ..................... B25B 7/22
7/168
2011/0199759 A1* 8/2011 Bevirt .................. F16M 13/022
362/418
(Continued)

FOREIGN PATENT DOCUMENTS

WO   WO-2021223679 A1 * 11/2021

OTHER PUBLICATIONS

Machine translation of WO 2021223679 A1 retrieved from the FIT database of PE2E search, see PE2E search history. (Year: 2023).*

*Primary Examiner* — Colin J Cattanach

(57) ABSTRACT

A lighting assembly includes a photographic lamp. The photographic lamp includes a lamp body, a first supporting arm and a second supporting arm. The first supporting arm is rotatably connected to a sidewall of the lamp body and capable of rotating around a rotation axis perpendicular to the sidewall of the lamp body. The second supporting arm is rotatably connected to the first supporting arm and capable of rotating around a rotation axis extending along a width direction of the first supporting arm. The rotation axis of the second supporting arm is perpendicular to the rotation axis of the first supporting arm. The second supporting arm includes a first rod and a second rod, the first rod being movable relative to the second rod to realize closing or opening of the second supporting arm.

20 Claims, 11 Drawing Sheets

(51) Int. Cl.
*G03B 17/56* (2021.01)
*H04M 1/12* (2006.01)
*G03B 15/04* (2021.01)
*H04M 1/04* (2006.01)
*H04M 1/72409* (2021.01)
*F21V 21/30* (2006.01)
*F21V 21/24* (2006.01)
*F21V 21/14* (2006.01)
*F21V 21/22* (2006.01)
*F21V 21/26* (2006.01)
*F21V 21/29* (2006.01)

(52) U.S. Cl.
CPC ............... *F21V 21/22* (2013.01); *F21V 21/24* (2013.01); *F21V 21/26* (2013.01); *F21V 21/29* (2013.01); *F21V 21/30* (2013.01); *G03B 15/041* (2013.01); *G03B 15/0431* (2013.01); *G03B 17/561* (2013.01); *H04M 1/04* (2013.01); *H04M 1/12* (2013.01); *H04M 1/72409* (2021.01); *H04M 1/724092* (2022.02)

(58) Field of Classification Search
CPC ......... F21V 21/29; F21V 21/30; G03B 15/02; G03B 17/561; F21S 6/00; F21S 6/002; F21S 6/003; F21S 6/004; F21S 6/005; F21S 6/006; F21S 6/007; F21S 6/008
See application file for complete search history.

(56) References Cited

U.S. PATENT DOCUMENTS

| | | | |
|---|---|---|---|
| 2012/0106944 A1* | 5/2012 | Johnson | H01G 9/0425 396/428 |
| 2012/0298829 A1* | 11/2012 | Johnson | F16M 11/36 248/188.4 |
| 2018/0224101 A1* | 8/2018 | Qiu | F21V 21/06 |
| 2021/0033248 A1* | 2/2021 | Cacciabeve | F21V 21/30 |
| 2022/0137491 A1* | 5/2022 | Stankie | F16M 11/041 396/428 |

* cited by examiner

PHOTOGRAPHIC LAMP AND LIGHTING ASSEMBLY

CROSS-REFERENCE TO RELATED APPLICATIONS

This application claims priority to Chinese Patent Application No. 202123125769.0, filed on Dec. 10, 2021, the entire contents of which are hereby incorporated by reference.

TECHNICAL FIELD

The present application relates to the technical field of photographic equipment, and in particular to a photographic lamp and a lighting assembly.

BACKGROUND

Lighting assembly is used to illuminate the external environment, so as to take photos of objects in a dark environment. Generally, a lighting assembly includes a photographic lamp. The photographic lamp supports a lamp body through a supporting arm and maintains the lamp body to illuminate forwards the object to be illuminated. In the related art, the supporting arm is fixed to a sidewall of the lamp body, which restricts rotation of the lamp body, resulting in inconvenient folding of the supporting arm to the lamp body.

SUMMARY

Regarding the abovementioned problems of the related art, the present application provides a photographic lamp and a lighting assembly to solve the problem of inconvenient folding of the supporting arm to the lamp body.

In one aspect, an embodiment of the present application provides a specific technical solution as follows:

A photographic lamp includes a lamp body; a first supporting arm being rotatably connected to a sidewall of the lamp body, the first supporting arm being capable of rotating around a rotation axis perpendicular to the sidewall of the lamp body; and a second supporting arm being rotatably connected to the first supporting arm, the second supporting arm being capable of rotating around a rotation axis extending along a width direction of the first supporting arm, the rotation axis of the second supporting arm being perpendicular to the rotation axis of the first supporting arm, the second supporting arm including a first rod and a second rod, the first rod being movable relative to the second rod to realize closing or opening of the second supporting arm.

In some embodiments, a first rotating seat is connected between the first supporting arm and the sidewall of the lamp body, the first rotating seat is fixedly connected to the sidewall of the lamp body, and the first supporting arm is rotatably sleeved on the first rotating seat.

In some embodiments, a second rotating seat is connected between the second supporting arm and the first supporting arm, the second rotating seat includes a first portion, and the first portion is accommodated in the first supporting arm and capable of rotating relative to the first supporting arm.

In some embodiments, the rotation axis of the first portion deviates from the center axis of the first portion.

In some embodiments, the second rotating seat further includes a second portion extending from a side of the first portion, and an end of the second portion extends beyond the first supporting arm to connect the second supporting arm.

In some embodiments, the second portion is rotatably connected to the first portion, and the second supporting arm is sleeved on the second portion to rotate along with the second portion.

In some embodiments, both the first rod and the second rod are rotatably connected to the second portion, and the first rod and the second rod rotate relative to each other with the second portion as a rotation axis.

In some embodiments, opposite sides of the first rod and the second rod are provided with a groove and a protrusion, respectively; and when the first rod and the second rod are closed, the protrusion engages into the groove.

In some embodiments, a length of the first supporting arm and a length of the second supporting arm are equal to or less than a length of the lamp body.

In another aspect, an embodiment of the present application provides a specific technical solution as follows:

A photographic lamp includes a lamp body; a first supporting arm with one end thereof being rotatably connected to a bottom of the lamp body; and a second supporting arm being rotatably connected to the other end of the first supporting arm, the second supporting arm including a first rod and a second rod, the first rod and second rod being hinged and capable of rotating relative to each other to close or open the second supporting arm.

In some embodiments, a first rotating seat is connected between the first supporting arm and the lamp body, a second rotating seat is connected between the second supporting arm and the first supporting arm, and a rotation axis of the second rotating seat rotating relative the first supporting arm is perpendicular to a rotation axis of the first supporting arm rotating relative to the lamp body.

In some embodiments, the second supporting arm is rotatably connected to the second rotating seat, and a rotation axis of the second supporting arm rotating relative the second rotating seat is perpendicular to the rotation axis of the second rotating seat rotating relative the first supporting arm.

In some embodiments, the second rotating seat includes a first portion and a second portion extending from a side of the first portion, the first portion is rotatably connected to the first supporting arm, and the second portion is rotatably connected to the second supporting arm.

In some embodiments, the rotation axis of the first portion is offset from the central axis of the first portion.

In some embodiments, the first rod includes a first connecting end and a first free end, the second rod includes a second connecting end and a second free end, the first and second connecting ends are sleeved on the second portion of the second rotating seat, and the first and second free ends capable of rotating relative to each other to close or open the second supporting arm.

In some embodiments, opposite sides of the first rod and the second rod are provided with a groove and a protrusion, respectively; and when the first rod and the second rod are closed, the protrusion engages into the groove.

In another aspect, an embodiment of the present application provides a specific technical solution as follows:

A lighting assembly includes a lamp body; a first supporting arm with one end thereof being rotatably connected to a bottom of the lamp body; a second supporting arm being rotatably connected to the other end of the first supporting arm, the second supporting arm comprising a first rod and a second rod, the first rod and second rod being hinged and capable of rotating relative to each other to close or open the second supporting arm; and a tripod connected to the first rod and/or the second rod.

In some embodiments, one of the first rod and the second rod is provided with a screw hole, and the tripod is connected to the screw hole.

In some embodiments, the first supporting arm defines a dovetail groove 22 at a side thereof away from the lamp body.

In some embodiments, a first rotating seat is connected between the first supporting arm and the lamp body, a second rotating seat is connected between the second supporting arm and the first supporting arm, the second rotating seat comprises a first portion and a second portion extending from a side of the first portion, the first portion is rotatably connected to the first supporting arm, and the second portion is rotatably connected to the second supporting arm.

The above technical solutions have the following beneficial effects:

For the photographic lamp and the lighting assembly provided in the embodiments of the present application, the first supporting arm is rotatably connected to the sidewall of the lamp body and rotates around a rotation axis perpendicular to the sidewall of the lamp body; the second supporting arm is rotatably connected to the first supporting arm and rotates around a rotation axis extending along a width direction of the first supporting arm; and the rotation axis of the first supporting arm is perpendicular to the rotation axis of the second supporting arm, so that the first supporting arm and the second supporting arm may have at least two free rotation degrees relative to the lamp body and support the lamp body in multiple directions, realizing folding of the first supporting arm and the second supporting arm relative to the lamp body. In addition, the second supporting arm includes a first rod and a second rod, the first rod and second rod may be opened or closed to realize supporting to the first supporting arm and the lamp body, further improving the working stability of the lamp body.

BRIEF DESCRIPTION OF THE DRAWINGS

In order to illustrate technical solutions of embodiments of the present application more clearly, drawings that need to be used in the description of the embodiments will be briefly described below. It is obvious that the drawings described below are only some embodiments of the present application, and other drawings may be obtained from the drawings without any creative work to those skilled in the art, which should be in the scope of this application. In the following description, the same reference numerals refer to the same members.

DESCRIPTION OF THE EMBODIMENTS

Figure 1:
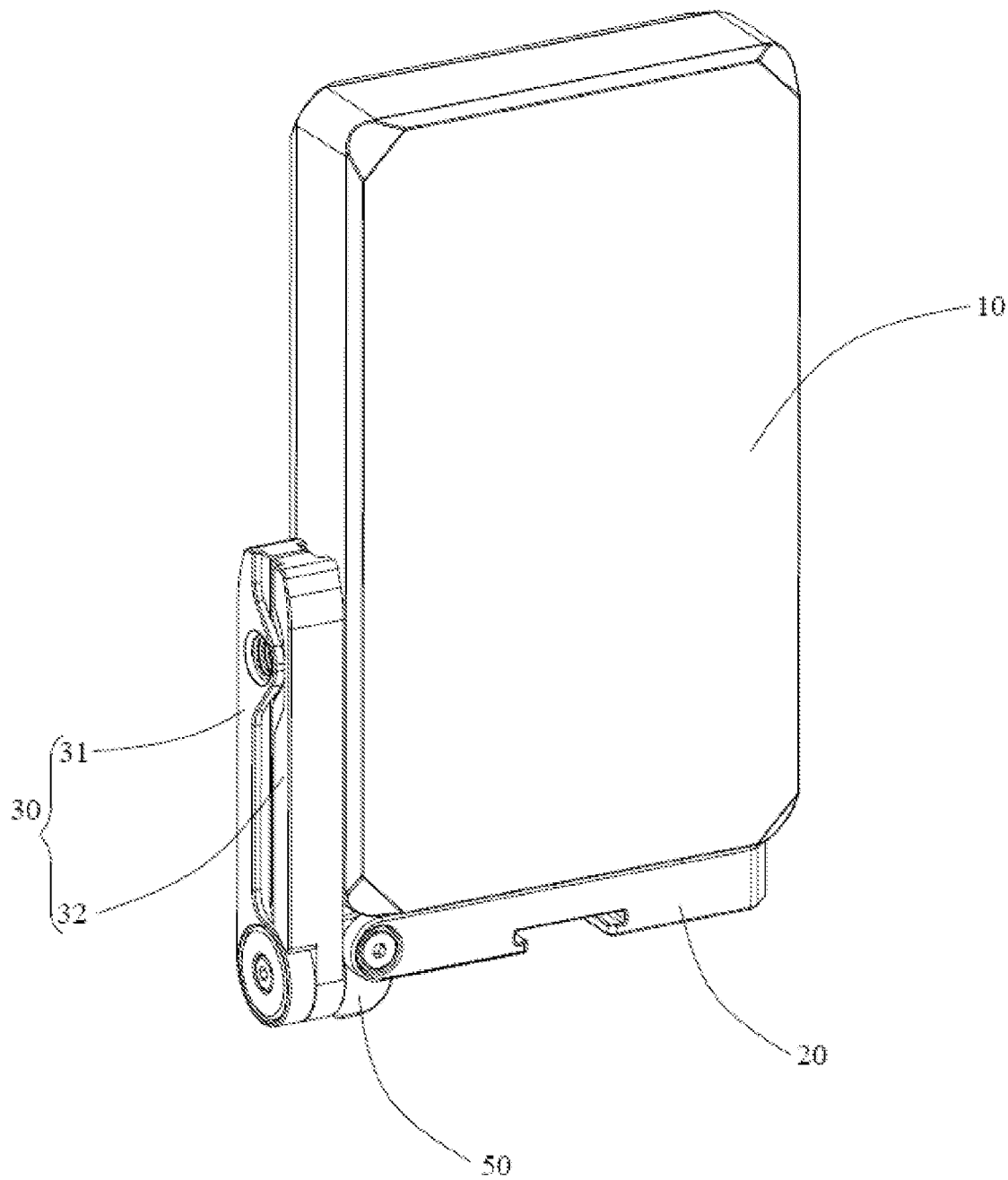
FIG. 1 is a schematic view of a photographic lamp provided by an embodiment of the present application.
Figure 2:
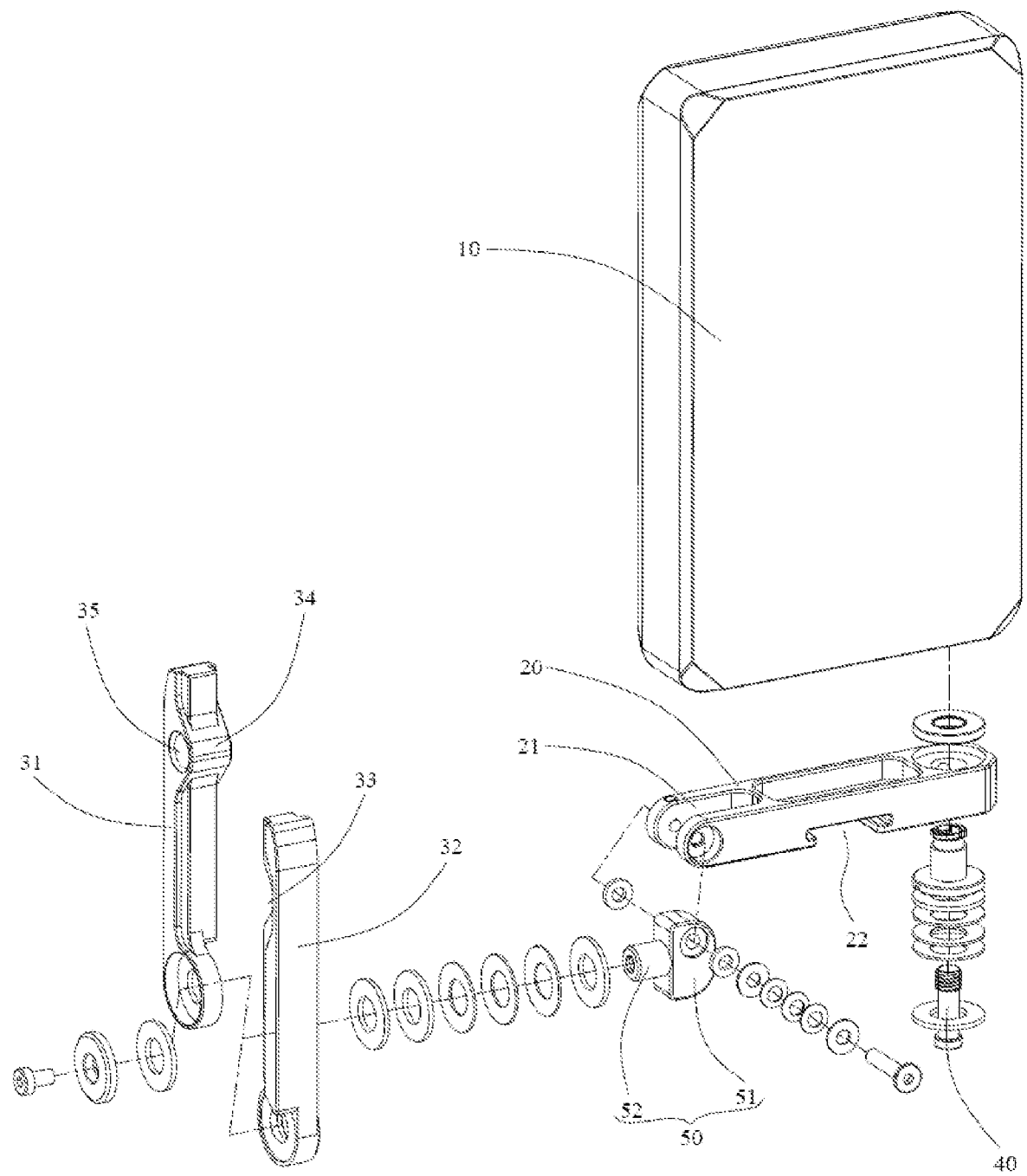
FIG. 2 is an exploded view of the photographic lamp of FIG. 1.

For better illustrating the technical means, creative features, objects and effects of the present application, detailed description will be given for the embodiments provided by the present application with reference to the append drawings. Obviously, the described embodiments are only a part of the embodiments, and not all of the embodiments of the present application. Based on the embodiments of the present application, all other embodiments obtained by those skilled in the art without any creative work should be in the scope of this application.

It should be noted that when an element is referred to as being "fixed to" or "disposed in/at" another element, it may be directly or indirectly on the other element. When an element is referred to as being "connected to" another element, it may be directly or indirectly connected to the other element.

It should be understood that oriental or positional relationships indicated by terms "length", "width", "upper", "lower", "front", "rear", "left", "right", "vertical", "horizontal", "top", "bottom", "inner", "outer" and the like are only intended to facilitate the description of the present disclosure and simplify the description based on oriental or positional relationships shown in the accompanying drawings, not to indicate or imply that the apparatus or element referred must have a specific orientation, is constructed and operated in a specific orientation, and therefore cannot be understood as a limitation of the present disclosure.

In addition, terms "first" and "second" are only used for descriptive purposes, and cannot be understood as indicating or implying relative importance or implicitly indicating the number of technical features indicated. Therefore, features defined with "first" and "second" may explicitly or implicitly include one or more of these features. In the description of the present disclosure, "a plurality of" refers to two or more than two, unless otherwise particularly defined.

An embodiment of the present application provides a photographic lamp and a lighting assembly, for solving the problem that a supporting arm is inconvenient to be folded to a lamp body of the photographic lamp.

Referring to FIG. 1 to FIG. 5, the lighting assembly includes a photographic lamp 100, which illuminates an object to be illuminated in multiple lighting angles. The photographic lamp 100 includes a lamp body 10, a first supporting arm 20 and a second supporting arm 30. Both the first supporting arm 20 and the second supporting arm 30 act on the lamp body 10 to maintain supporting to the lamp body 10 in multiple directions and facilitate folding of the lamp body 10.

The lamp body 10, as a lighting member, emits light outwards to illuminate the object. Optionally, a light source is disposed in the lamp body 10 and emits light outwards.

The first supporting arm 20 is rotatably connected to a sidewall of the lamp body 10 and rotates in a plane parallel to the sidewall of the lamp body 10 around with a rotation axis O1 which is perpendicular to the sidewall of the lamp body 10. In this embodiment, the first supporting arm is connected to the bottom sidewall of the lamp body 10 and rotates 360 degrees in a horizontal plane.

When the first supporting arm 20 rotates relative to the lamp body 10, the first supporting arm 20 may be placed below the bottom sidewall of the lamp body 10 (as shown in FIG. 1) and within a periphery of the bottom sidewall of the lamp body 10, thereby improving an appearance of the photographic lamp 100 in a folded state. In this situation, a length of the first supporting arm is less than or equal to a length of the sidewall of the lamp body 10.

The first supporting arm 20 and the sidewall of the lamp body 10 are connected by a first rotating seat 40. The first rotating seat 40 may be fixedly connected to the sidewall of the lamp body 10, and an end of the first supporting arm 20 may be rotatably sleeved on the first rotating seat 40. In this way, the first supporting arm 20 rotates relative to the lamp body 10 around with the first rotating seat 40 as the rotation axis O1 thereof, adjusting an angle between the first supporting arm 20 and the lamp body 10.

The first rotating seat 40 is disposed at an end of the sidewall of the lamp body 10, which facilitates rotation of the first supporting arm 20 relative to the lamp body 10 in the horizontal plane, and improves a rotation angle of the first supporting arm 20 relative to the lamp body 10. In this embodiment, a dovetail groove 22 is defined in a middle portion of the first rotating seat 40. The dovetail groove 22 is concaved at a side of the first rotating seat 40 away from the lamp body 10, for connecting the photographic lamp 100 to other members of the photographic equipment.

The second supporting arm 30 is rotatably connected to the first supporting arm 20 and has a rotation axis O2 extending along a width direction of the first supporting arm 20. The rotation axis O2 that the second supporting arm 30 rotates relative to the first supporting arm 20 is perpendicular to the rotation axis O1 that the first supporting arm 20 rotates relative to the lamp body 10 which extends along a height direction of the first supporting arm 20, so that the first supporting arm 20 and the second supporting arm 30 may have at least two free rotation degrees relative to the lamp body 10. Thus, the first supporting arm 20 and the second supporting arm 30 may support the lamp body 10 in multiple directions, and folding of the first supporting arm 20 and the second supporting arm 30 relative to the lamp body 10 may be realized.

The first supporting arm 20 and the second supporting arm 30 are connected by a second rotating seat 50. The second rotating seat 50 includes a first portion 51 and a second portion 52. The first portion 51 is accommodated in and rotatably connected to the first supporting arm 20, and has a rotation axis O2 extending along the width direction of the first supporting arm 20. That is, the rotation axis O2 that the first portion 51 rotates relative to the first supporting arm 20 is perpendicular to the rotation axis O1 that the first supporting arm 20 rotates relative to the lamp body 10. The first supporting arm 20 is provided with a slot 21, and the first portion 51 is received in the slot 21 and rotatably connected to the first supporting arm 20 through a rotating shaft.

In this embodiment, the second rotating seat 50 is disposed at the other end of the first supporting arm 20 without the first rotating seat 40. The second portion 52 may be formed integrally with the first portion 52, and extend outwardly from the first portion 51 along a length direction of the first supporting arm 20. The second supporting arm 30 is rotatably sleeved on the second portion 52, a rotation axis O3 that the second supporting arm 30 rotates relative to second portion 52 is perpendicular to the rotation axis O2 that the first portion 51 rotates relative to the first supporting arm 20.

As shown in FIG. 1, the second supporting arm 30 may be rotated to abut a lateral sidewall of the lamp body 10, and in this situation the rotation axis O3 of the second supporting arm 30 extends along the length direction of the first supporting arm 20. An end of the second portion 52 extends beyond the slot 21 of the first supporting arm 20, facilitating connection and rotation of the second supporting arm 30.

Alternately, the first portion 51 and second portion 52 may be formed separately and then assembled together. The second portion 52 may be rotatably connected to the first portion 51, and the second supporting arm 30 may be fixed to the second portion 52 and rotate along with the second portion 52, also realizing rotation of the second supporting arm 30 relative to the first supporting arm 20.

The rotation axis O3 of the second supporting arm 30 is perpendicular to the rotation axis O2 of the first portion 51, the rotation axis O2 of the first portion 51 is perpendicular to the rotation axis O1 of the first supporting arm 20, and the rotation axis O1 of the first supporting arm 20 is perpendicular to the sidewall of the lamp body 10, thus the second supporting arm 30 and the first supporting arm 20 may form an angle of any degrees therebetween by the rotation of the first supporting arm 20 and the second supporting arm 30, and the photographic lamp 100 supported by the first supporting arms 20 and second supporting arm 30 may be adjusted to any light angle in three-dimensional space, an shown in FIG. 1, FIG. 3, FIG. 4, FIG. 6 and FIG. 7.

Figure 3:
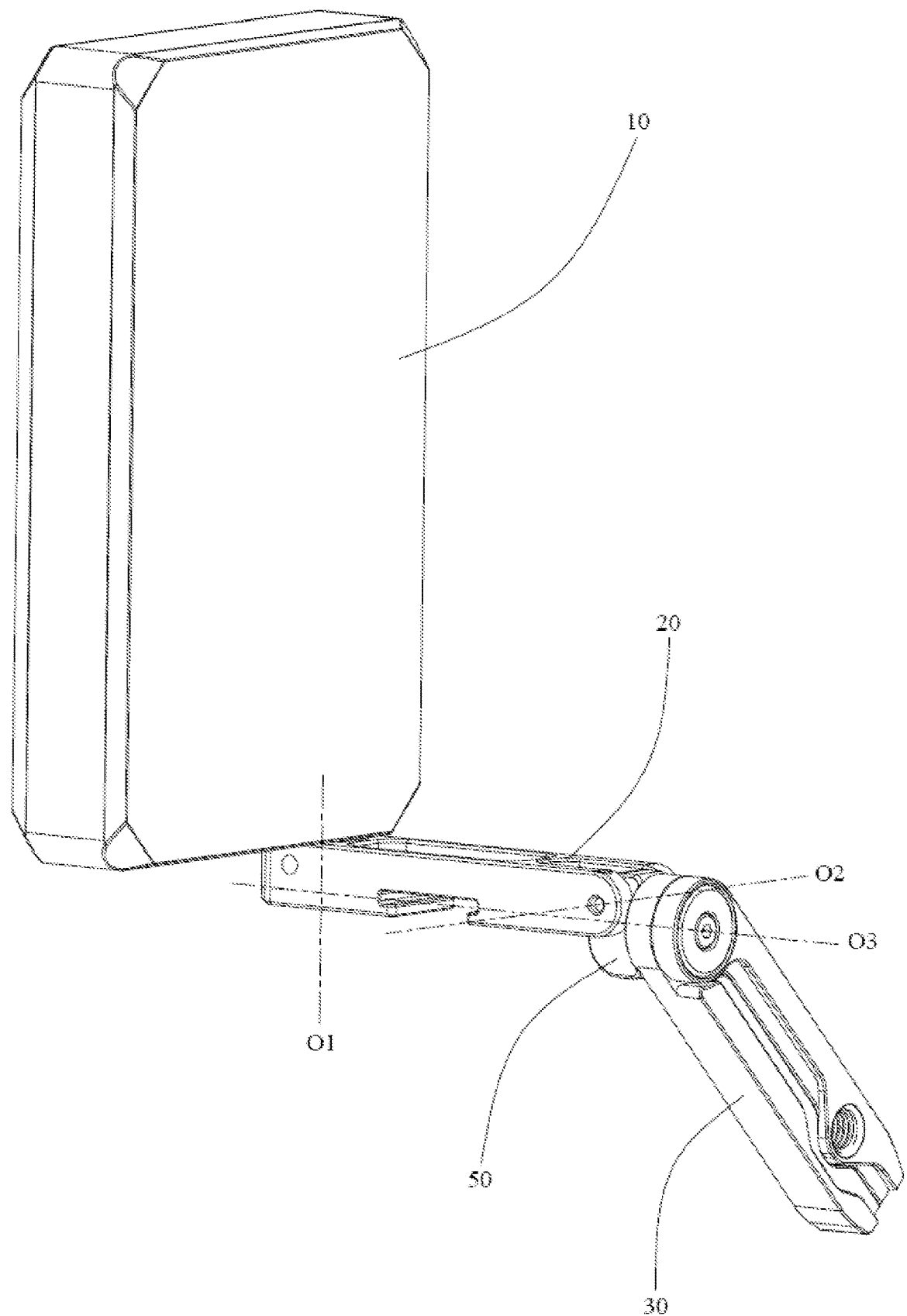
FIG. 3 shows rotation axes of supporting arms of the photographic lamp provided by the embodiment of the present application.
Figure 4:
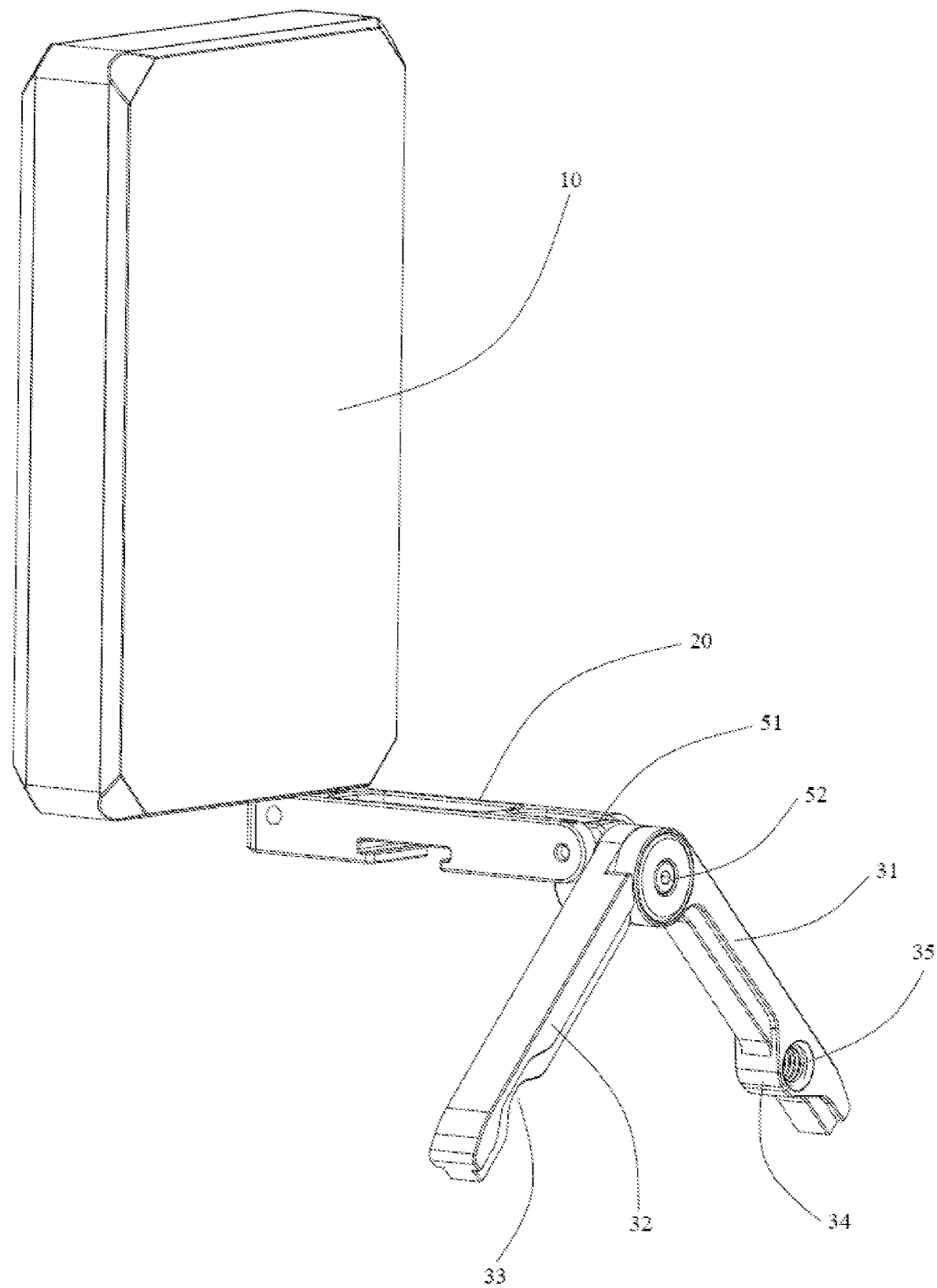
FIG. 4 shows the photographic lamp unfolded to a first state.
Figure 5:
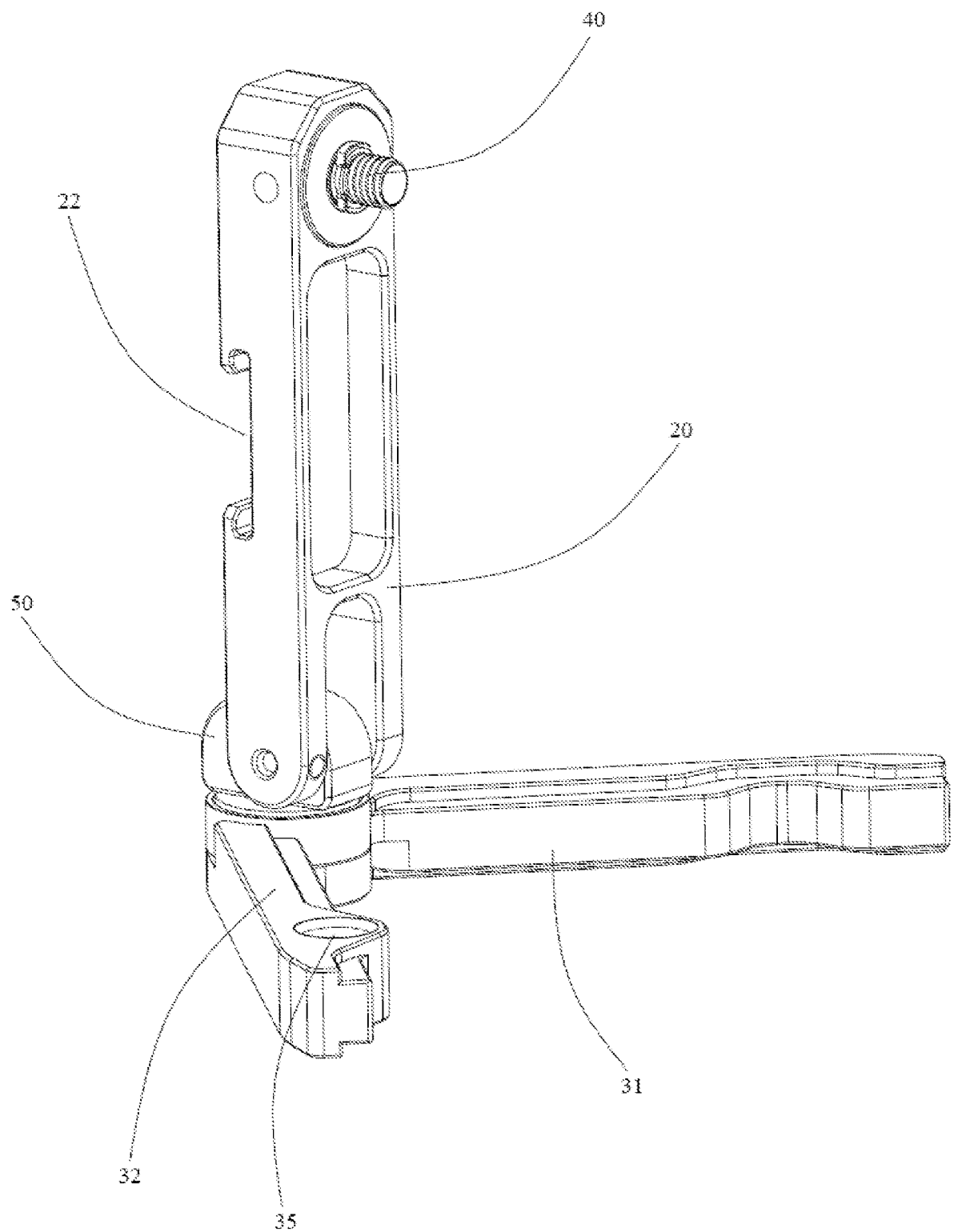
FIG. 5 shows the supporting arms of the photographic lamp of FIG. 4 in another aspect.
Figure 6:
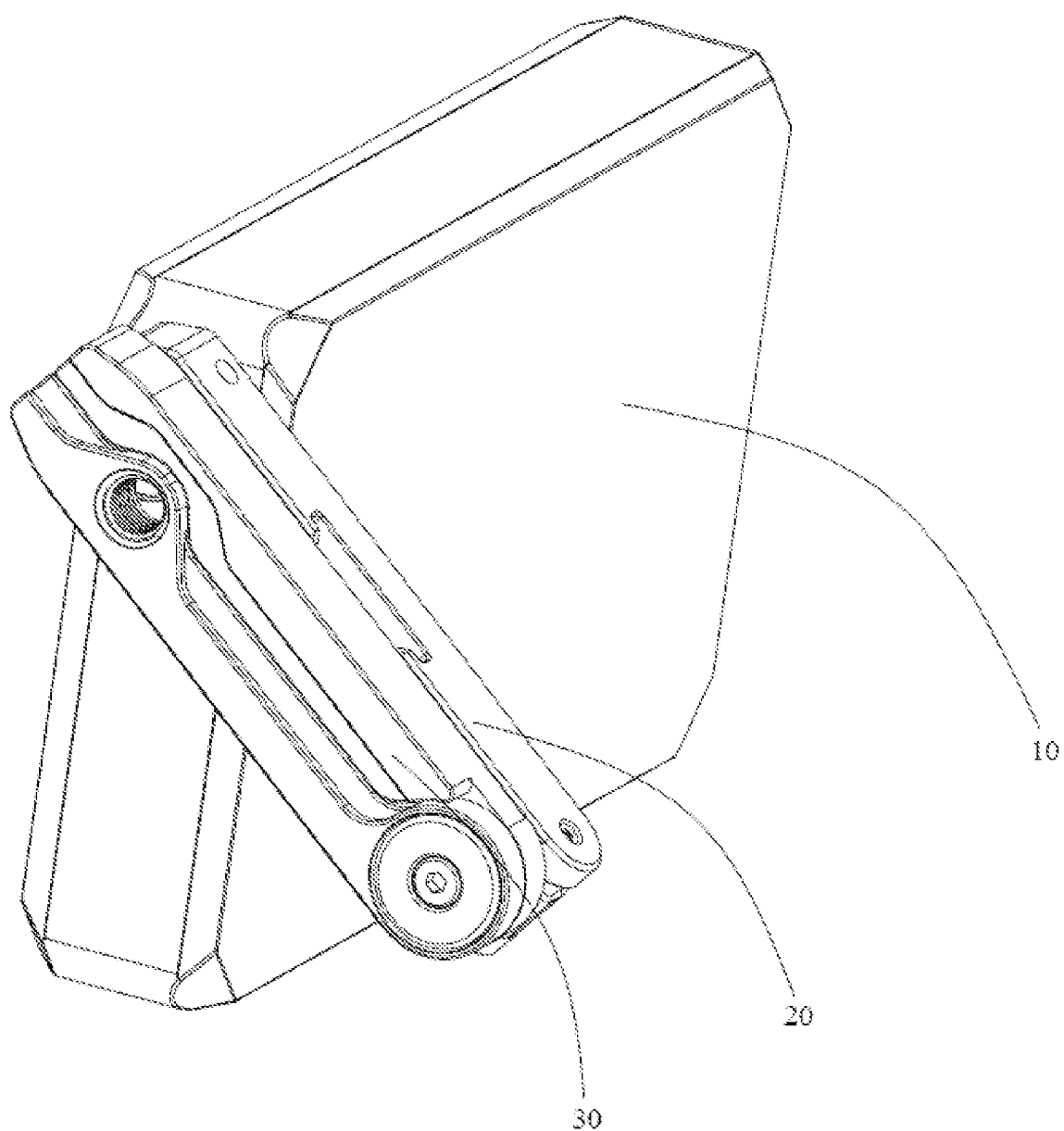
FIG. 6 shows the photographic lamp unfolded to a second state.
Figure 7:
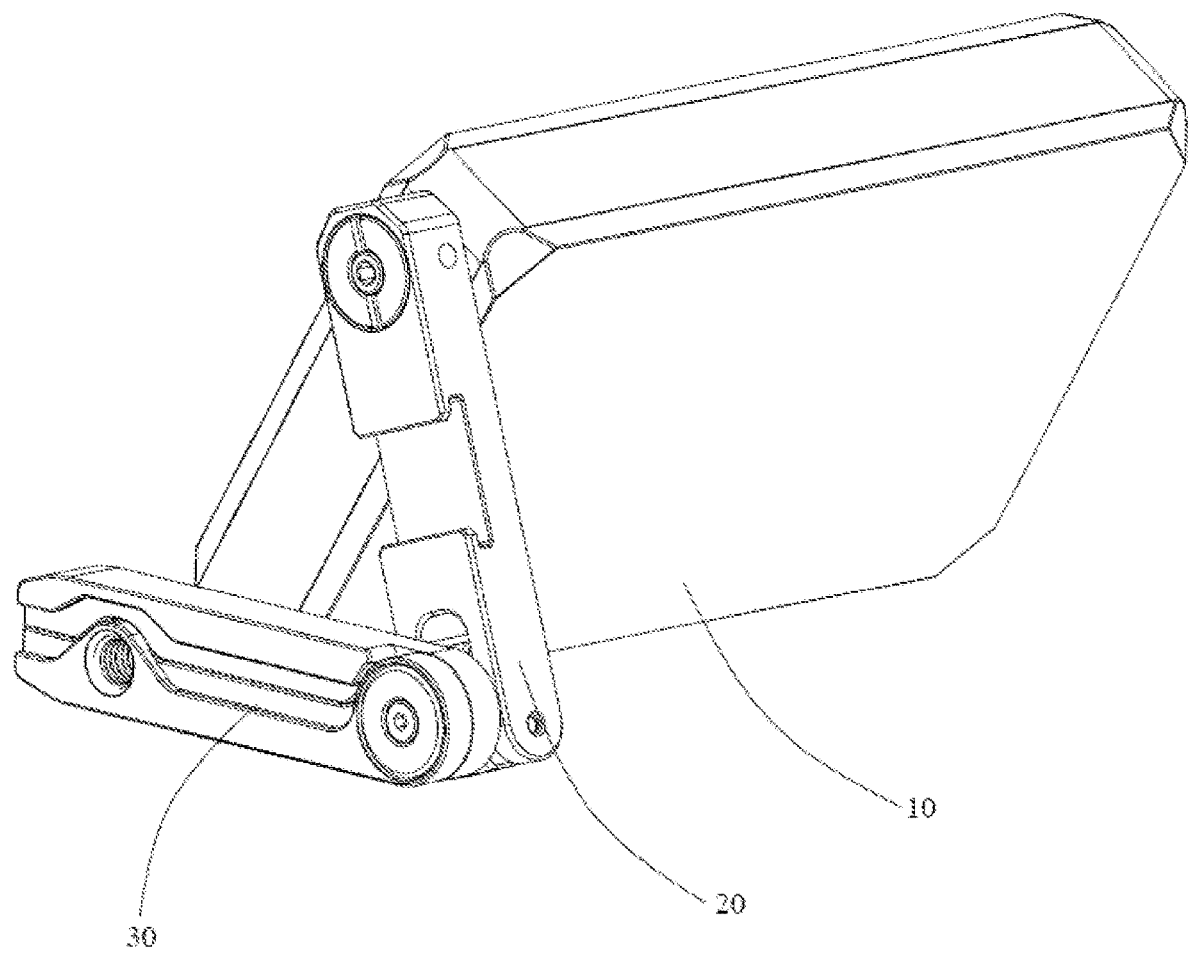
FIG. 7 shows the photographic lamp unfolded to a third state.
Figure 8:
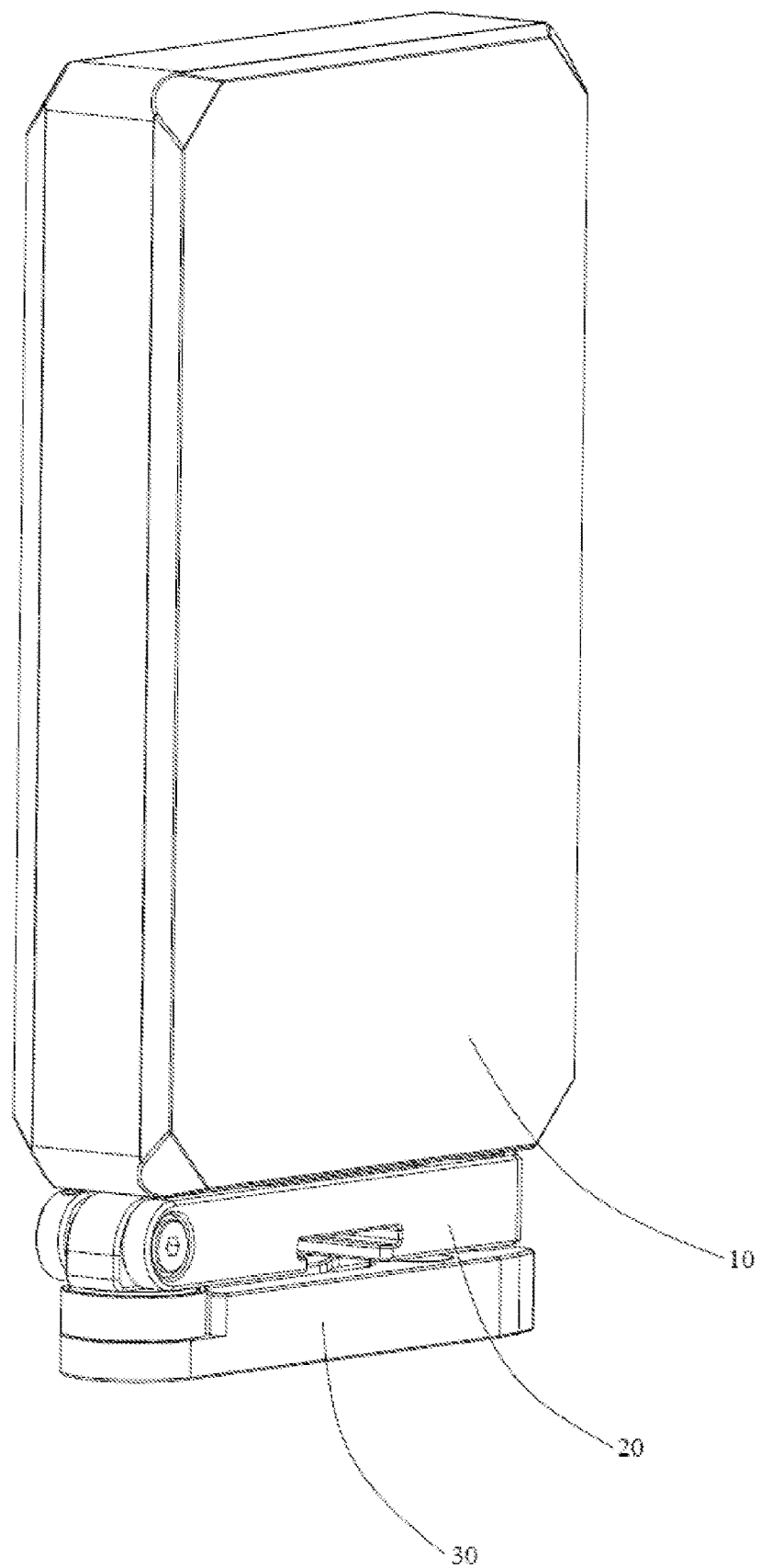
FIG. 8 shows the photographic lamp in a folded state.

During rotation of the second supporting arm 30, the direction of the rotation axis O3 of the second supporting arm 30 may be constantly changing. In FIGS. 3-5, the second supporting arm 30 is in a state perpendicular to the first supporting arm 20, the rotation axis O3 of the second supporting arm 30 may extend along the length direction of the lamp body 10 (as shown in FIG. 1) or extend along the width direction of the lamp body 10 (as shown in FIG. 3). It should be understood that the second supporting arm 30 may be rotated to overlap with the first supporting arm 20, and in this situation, the rotation axis O3 of the second supporting arm 30 may extend along the height direction of the lamp body 10, which is parallel to the rotation axis of the first supporting arm 20, as shown in FIG. 8.

In this embodiment, the rotation axis O2 of the first portion 51 deviates from the center axis of the first portion 51. That is, the first portion 51 is offset connected to the first supporting arm 20, and the second portion 52 may swing relative to the first supporting arm 20 along two directions. In this situation, the first supporting arm 20 and the second supporting arm 30 may be overlapped, and a length of the second supporting arm 30 is preferably less than or equal to the length of the sidewall of the lamp body 10 for better appearance.

During rotation of the first portion 51, the bottom sidewall of the lamp body 10 may collide with the first portion 51, and the lateral sidewall of the lamp body 10 may collide with the second portion 52, which restrict continuous rotation of the first rotating seat 50, and limits a rotation angle of the first rotating seat 50 to be 180°.

The second supporting arm 30 includes a first rod 31 and a second rod 32. The first rod 31 includes a first connecting end and a first free end, and the second rod 32 includes a second connecting end and a second free end. The first and second connecting ends are rotatably connected to the second portion 52 of the second rotating seat 50. That is, first and second connecting ends are hinged together, and the first and second free ends may move towards each other to realize closing of the first rod 31 and second rod 32 of the second supporting arm 30, or move away from each other to realize opening of the first rod 31 and second rod 32 of the second supporting arm 30. The second supporting arm 30 realize supporting to the first supporting arm 20 and the lamp body 10 through opening and closing of the first rod 31 and second rod 32, which further improves a working stability of the lamp body 10.

Both the first rod 31 and the second rod 32 are rotatably sleeved on the second portion 52, and are opened or closed with the second portion 52 as the rotation axis. Specifically, both the first rod 31 and the second rod 32 may rotate relative to the second portion 52 to adjust angles between the first rod 31/second rod 32 and the second portion 52, so that the second supporting arm 30 may be connected to the first supporting arm 20 at multiple angles.

Figure 9:
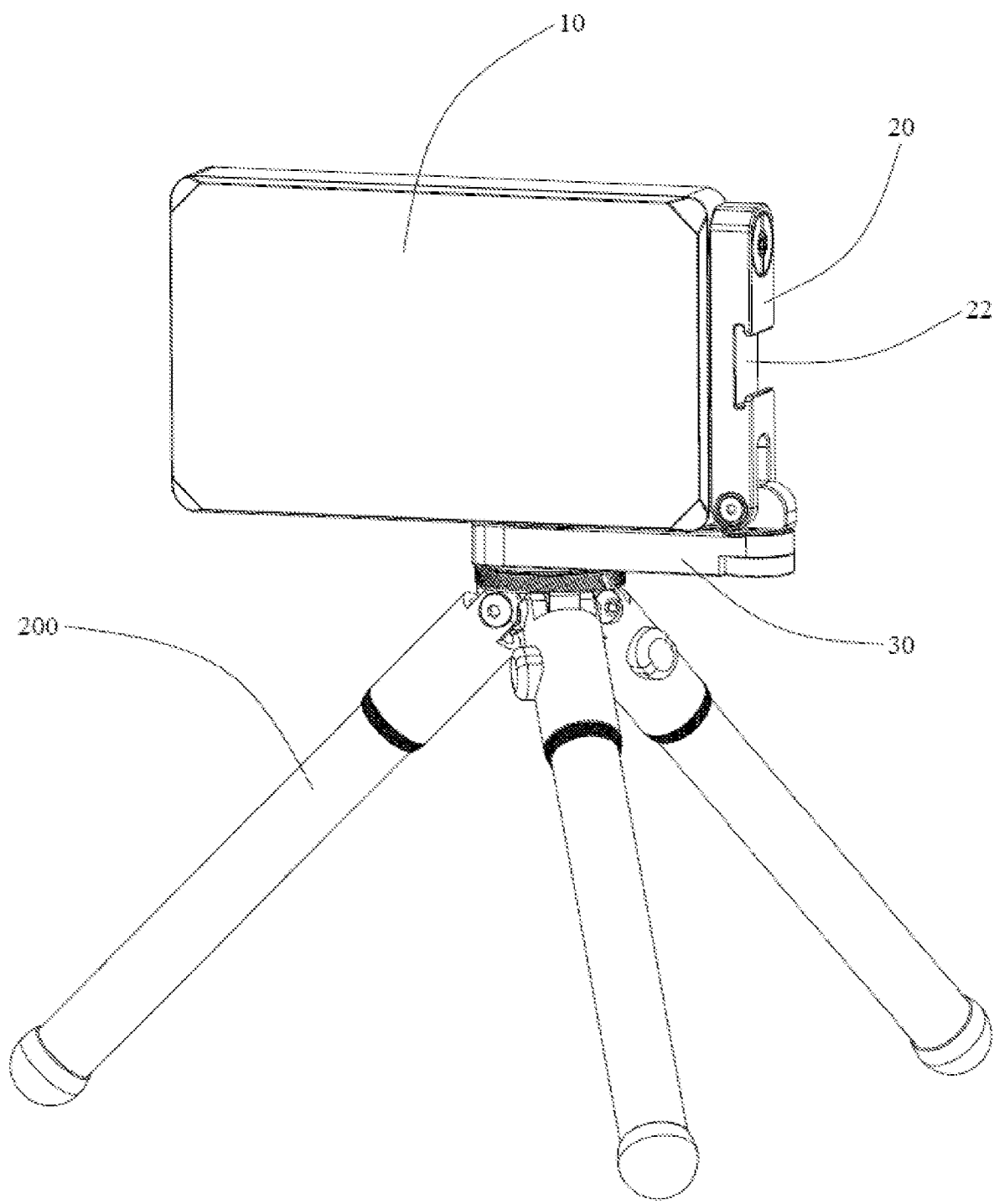
FIG. 9 shows the photographic lamp being supported by a tripod.
Figure 10:
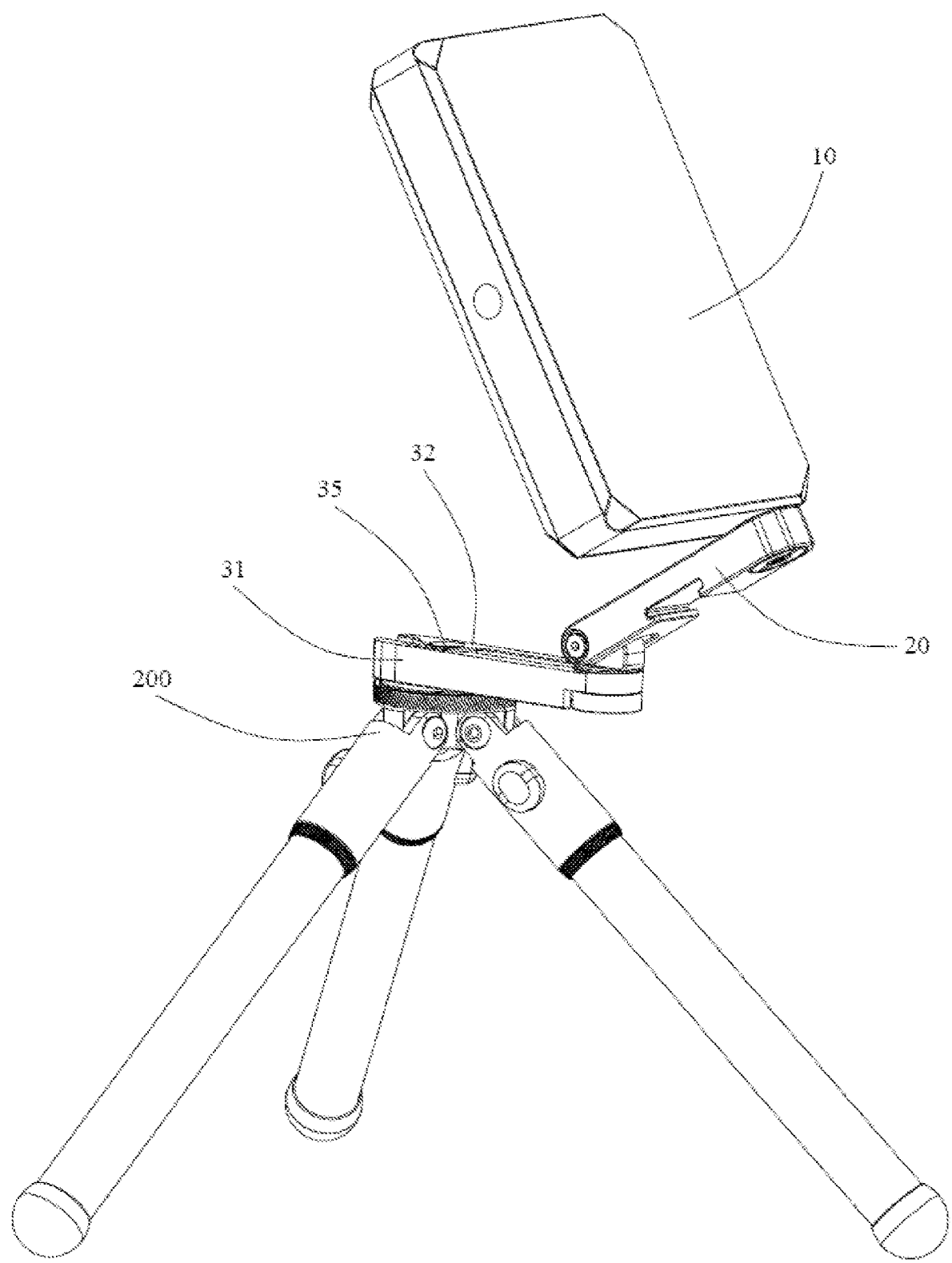
FIG. 10 shows the photographic lamp rotated on the tripod to a fourth state.
Figure 11:
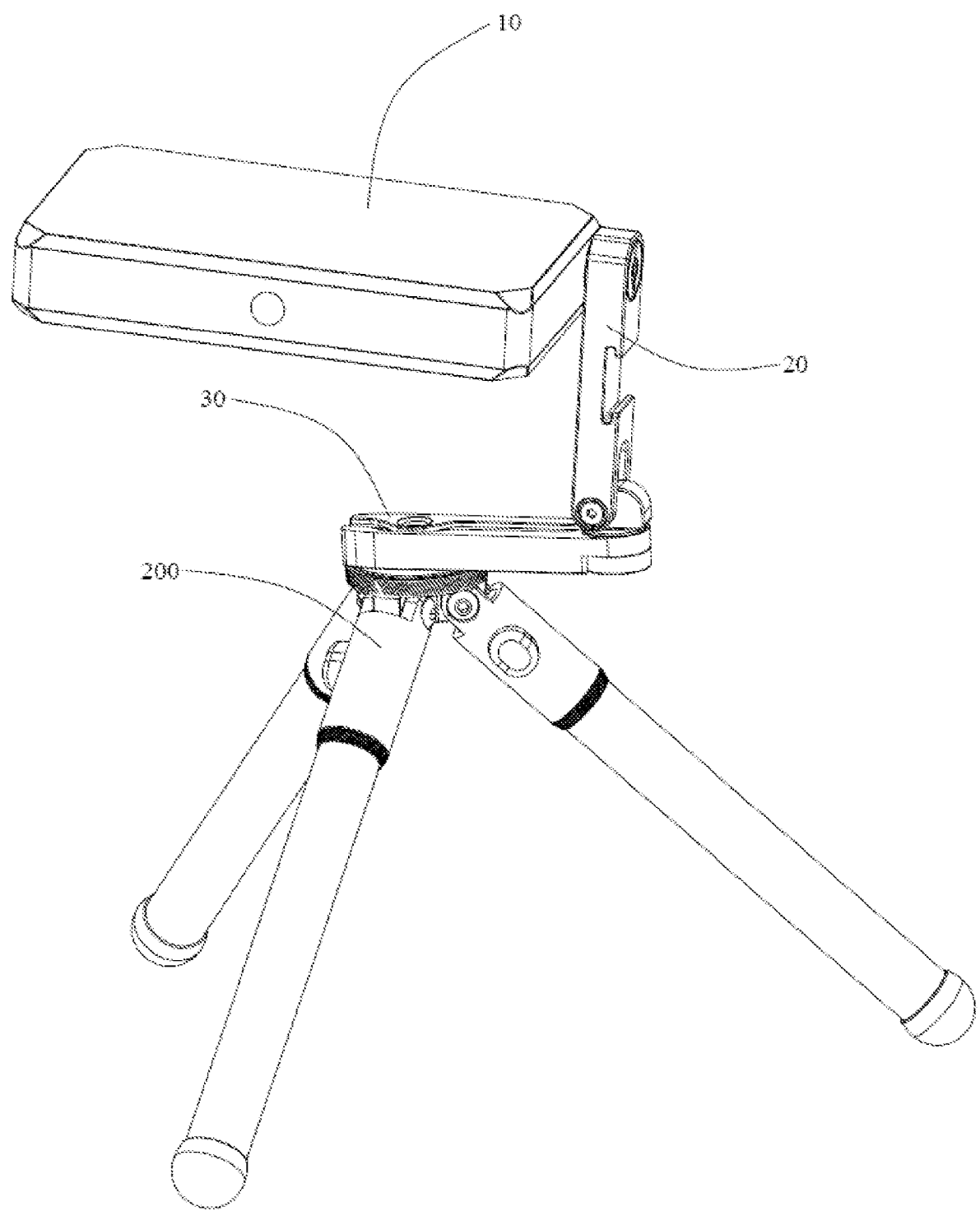
FIG. 11 shows the photographic lamp rotated on the tripod to fifth fourth state.

Optionally, opposite sides of the first rod 31 and second rod 32 are provided with a groove 33 and a protrusion 34, respectively. When the first rod 31 and the second rod 32 are closed, the protrusion 34 engages into the groove 33 and positioned within the groove 33 to maintain closing of the the second supporting arm 30. In this embodiment, the protrusion 34 defines a connecting hole 35 therein, the connecting hole 35 is preferably a screw hole. As shown in FIGS. 9-11, the lighting assembly may further include a tripod 200, and the photographic lamp 100 may be fixed onto the tripod 200 by a screw which extends through the tripod 200 and screwed into the connecting hole 35.

For the photographic lamp 100 and the lighting assembly provided in the embodiment of the present application, the first supporting arm 20 is rotatably connected to the sidewall of the lamp body 10 and rotates around a rotation axis perpendicular to the sidewall of the lamp body 10; the second supporting arm 30 is rotatably connected to the first supporting arm 20 and rotates around a rotation axis extending along a width direction of the first supporting arm 20; and the rotation axis of the first supporting arm 20 is perpendicular to the rotation axis of the second supporting arm 30, so that the first supporting arm 20 and the second supporting arm 30 may have at least two free rotation degrees relative to the lamp body 10 and support the lamp body 10 in multiple directions, realizing folding of the first supporting arm 20 and the second supporting arm relative to the lamp body 10. In addition, the second supporting arm 30 includes a first rod 31 and a second rod 32, the first rod 31 and second rod 32 may be opened or closed to realize supporting to the first supporting arm 20 and the lamp body 10, further improving the working stability of the lamp body 10.

In the above embodiments, the description of each embodiment has its own focus. For the members not described in detail in one embodiment, please refer to the relevant description of other embodiments.

The above merely provides the preferred embodiments of the present disclosure, which is illustrative, rather than restrictive, to the present disclosure. However, it should be understood by those skilled in the art that, many variations, modifications even substitutions that do not depart from the spirit and scope defined by the present disclosure, shall fall into the extent of protection of the present disclosure.

What is claimed is:

1. A photographic lamp, comprising:
   a lamp body;
   a first supporting arm being rotatably connected to a sidewall of the lamp body, the first supporting arm being capable of rotating around a rotation axis perpendicular to the sidewall of the lamp body; and
   a second supporting arm being rotatably connected to the first supporting arm, the second supporting arm being capable of rotating around a rotation axis extending along a width direction of the first supporting arm, the rotation axis of the second supporting arm being perpendicular to the rotation axis of the first supporting arm, the second supporting arm comprising a first rod and a second rod, the first rod being movable relative to the second rod to realize closing or opening of the second supporting arm;
   wherein a second rotating seat is connected between the second supporting arm and the first supporting arm, the second rotating seat comprises a first portion, and the first portion is accommodated in the first supporting arm and capable of rotating relative to the first supporting arm;
   wherein the second rotating seat further comprises a second portion extending from a side of the first portion, and an end of the second portion extends beyond the first supporting arm to connect the second supporting arm; and
   wherein both the first rod and the second rod are rotatably connected to the second portion, and the first rod and the second rod rotate relative to each other with the second portion as a rotation axis.

2. The photographic lamp of claim 1, wherein a first rotating seat is connected between the first supporting arm and the sidewall of the lamp body, the first rotating seat is fixedly connected to the sidewall of the lamp body, and the first supporting arm is rotatably sleeved on the first rotating seat.

3. The photographic lamp of claim 2, wherein opposite sides of the first rod and the second rod are provided with a groove and a protrusion, respectively; and when the first rod and the second rod are closed, the protrusion engages into the groove.

4. The photographic lamp of claim 1, wherein the rotation axis of the first portion deviates from the center axis of the first portion.

5. The photographic lamp of claim 1, wherein a length of the first supporting arm and a length of the second supporting arm are equal to or less than a length of the lamp body.

6. The photographic lamp of claim 1, wherein the second portion is rotatably connected to the first portion, and the second supporting arm is sleeved on the second portion to rotate along with the second portion.

7. A photographic lamp, comprising:
   a lamp body;
   a first supporting arm with one end thereof being rotatably connected to a bottom of the lamp body; and
   a second supporting arm being rotatably connected to the other end of the first supporting arm, the second supporting arm comprising a first rod and a second rod, the first rod and second rod being hinged and capable of rotating relative to each other to close or open the second supporting arm;
   wherein a second rotating seat is connected between the second supporting arm and the first supporting arm;
   wherein the second rotating seat comprises a first portion being rotatably connected to the first supporting arm and a second portion being rotatably connected to the second supporting arm; and
   wherein the first rod comprises a first connecting end and a first free end, the second rod comprises a second connecting end and a second free end, the first and second connecting ends are sleeved on the second portion of the second rotating seat, and the first and second free ends are capable of rotating relative to each other to close or open the second supporting arm.

8. A lighting assembly comprising a photographic lamp according to claim 7, wherein:
a tripod is connected to the first rod and/or the second rod.

9. The lighting assembly of claim 8, wherein one of the first rod and the second rod is provided with a screw hole, and the tripod is connected to the screw hole.

10. The lighting assembly of claim 8, wherein the first supporting arm defines a dovetail groove at a side thereof away from the lamp body.

11. The photographic lamp of claim 7, wherein a first rotating seat is connected between the first supporting arm and the lamp body, and a rotation axis of the second rotating seat rotating relative the first supporting arm is perpendicular to a rotation axis of the first supporting arm rotating relative to the lamp body.

12. The photographic lamp of claim 11, wherein a rotation axis of the second supporting arm rotating relative the second rotating seat is perpendicular to the rotation axis of the second rotating seat rotating relative the first supporting arm.

13. The photographic lamp of claim 12, wherein the second portion extends from a side of the first portion, and an end of the second portion extends beyond the first supporting arm to connect the second supporting arm.

14. The photographic lamp of claim 13, wherein the rotation axis of the first portion is offset from the central axis of the first portion.

15. The photographic lamp of claim 7, wherein opposite sides of the first rod and the second rod are provided with a groove and a protrusion, respectively; and when the first rod and the second rod are closed, the protrusion engages into the groove.

16. A lighting assembly comprising:
a lamp body;
a first supporting arm being rotatably connected to a sidewall of the lamp body, the first supporting arm being capable of rotating around a rotation axis perpendicular to the sidewall of the lamp body; and
a second supporting arm being rotatably connected to the first supporting arm, the second supporting arm being capable of rotating around a rotation axis extending along a width direction of the first supporting arm, the rotation axis of the second supporting arm being perpendicular to the rotation axis of the first supporting arm, the second supporting arm comprising a first rod and a second rod, the first rod being movable relative to the second rod to realize closing or opening of the second supporting arm;
wherein a second rotating seat is connected between the second supporting arm and the first supporting arm, the second rotating seat comprises a first portion, and the first portion is accommodated in the first supporting arm and capable of rotating relative to the first supporting arm;
wherein the second rotating seat further comprises a second portion extending from a side of the first portion, and an end of the second portion extends beyond the first supporting arm to connect the second supporting arm; and
wherein the second portion is rotatably connected to the first portion, and the second supporting arm is sleeved on the second portion to rotate along with the second portion.

17. The photographic lamp of claim 16, wherein a first rotating seat is connected between the first supporting arm and the sidewall of the lamp body, the first rotating seat is fixedly connected to the sidewall of the lamp body, and the first supporting arm is rotatably sleeved on the first rotating seat.

18. The photographic lamp of claim 16, wherein the rotation axis of the first portion deviates from the center axis of the first portion.

19. The photographic lamp of claim 16, wherein the second portion is rotatably connected to the first portion, and the second supporting arm is sleeved on the second portion to rotate along with the second portion.

20. The photographic lamp of claim 16, wherein opposite sides of the first rod and the second rod are provided with a groove and a protrusion, respectively; and when the first rod and the second rod are closed, the protrusion engages into the groove.

* * * * *